Figure 1:
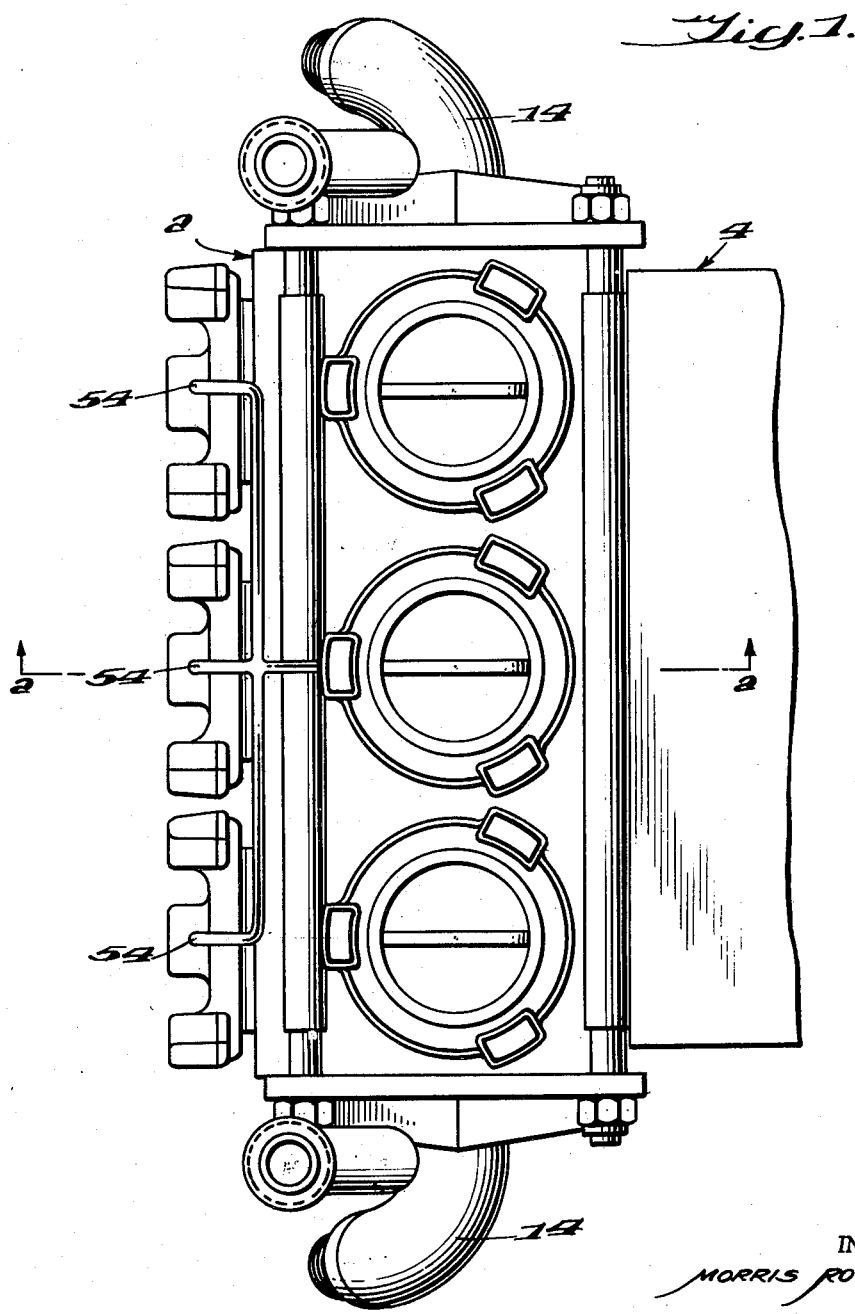

United States Patent Office 3,259,075
Patented July 5, 1966

3,259,075
PUMP CYLINDER HEAD
Morris Roth, Duncan, Okla., assignor to Halliburton Company, Duncan, Okla., a corporation of Delaware
Filed Oct. 28, 1964, Ser. No. 407,049
8 Claims. (Cl. 103—202)

This invention relates to pump cylinder heads, and more particularly, to an improved cylinder closure.

It is common practice to provide a removable cover or head for the valve end of a pump cylinder. The cover must be readily removable to facilitate replacement of seals and repair of the interior of the pump. In its simplest form, the conventional cylinder cover is a wide, threaded plug which engages internal threads in the pump housing. Flexible seals prevent the leakage of fluid around the plug, but while the pump is in operation, the threads of the plug are subjected to alternating high pressure and low pressure as the pump piston compresses the fluid in the chamber on the forward stroke and draws uncompressed fluid into the pump chamber on the return stroke. Under normal operating conditions the plug threads can withstand the large changes of pressure which occur in cyclic intervals, but under very high pressure conditions the plug threads may fracture due to metal fatigue.

Another problem encountered with a conventional cylinder cover plug is that the seal is compressed between the plug and the housing by the axial force imposed on the seal by the plug threads. During assembly, the seal is compressed by threading the conventional plug into the housing. The frictional load on the threads increases in proportion to the compressive load on the seal, and the frictional load may become so great that the plug cannot be turned. The seal can be compressed sufficiently by this means to prevent leakage under normal operating conditions, but under severe loading and very high pressure conditions, leakage may occur.

Accordingly, it is an object of this invention to provide a cylinder cover for very high pressure service.

It is a further object of this invention to provide a threaded cylinder cover which reduces cyclic loading on the threads.

It is another object of this invention to provide a threaded cylinder cover which imposes a high compression pressure on the plug seal, without excessive stress on the threads.

These objects are accomplished in accordance with the preferred embodiment of the invention by a cylinder head plug having a separate cover element which compresses a seal ring against a shoulder in the pump housing. A cover retainer, which is in the form of a ring, embraces a cylindrical portion of the cover element and has external screw threads which engage threads in the housing. A fluid chamber is formed between opposing radial surfaces on the retainer and on the cover element, and a passageway extends through the retainer. A conduit connects the passageway with the exhaust manifold of the pump. When the pump is in operation, fluid pressure in the manifold is transmitted to the fluid chamber between the retainer and the cover element and provides an augmenting force for compressing the seal. On the compression stroke, the axial force exerted on the retainer ring is about the same as would be imposed if the retainer and cover element were one piece, but on the return stroke, the fluid pressure between the retainer ring and the cover element increases the pressure on the seal and on the retainer ring threads. Therefore, this arrangement substantially reduces the cyclic loading on the plug threads, and at the same time provides a high compressive force on the seal.

Figure 2:
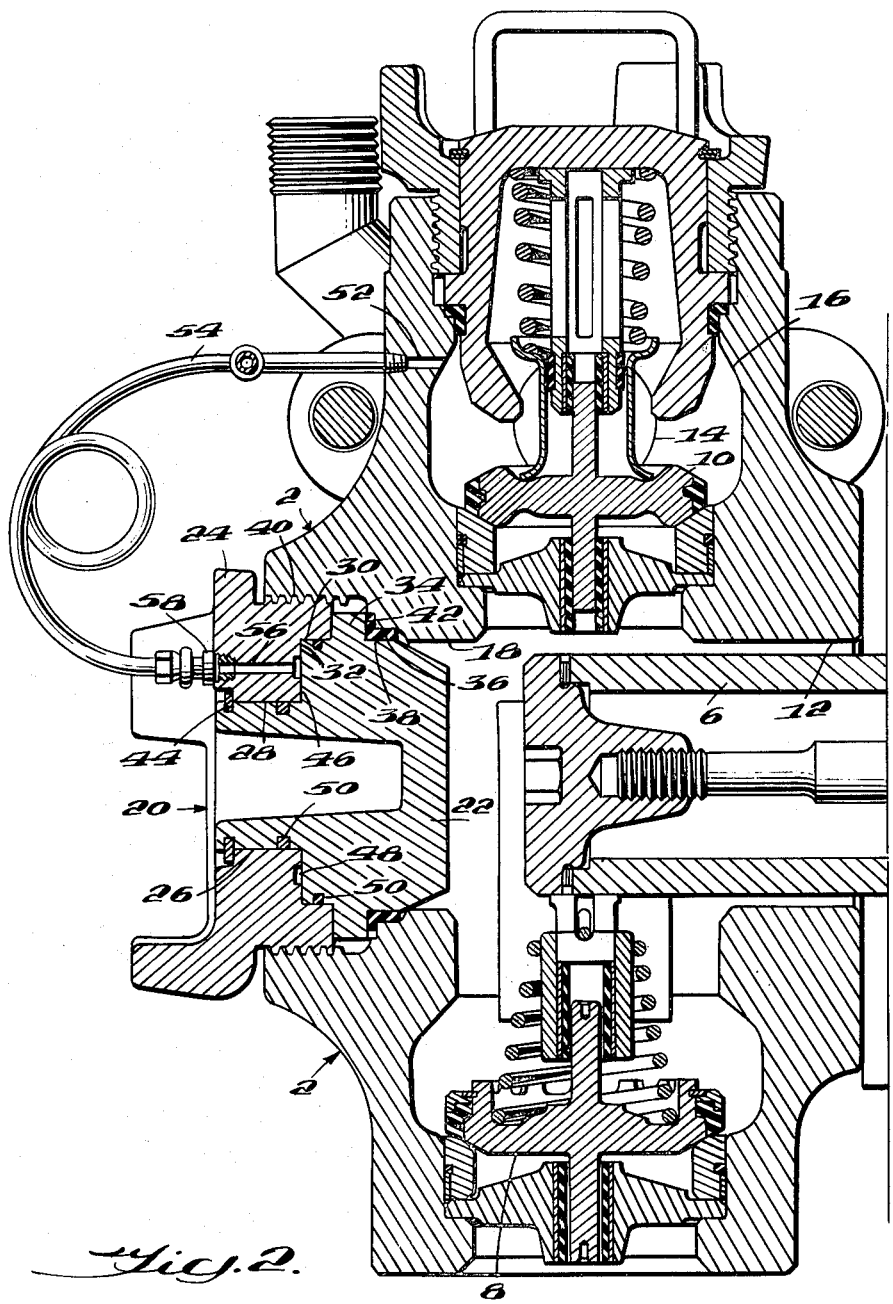

This preferred embodiment of the invention is illustrated in the accompanying drawings in which:

FIG. 1 is a top plan view of the cylinder portion of a fluid pump according to this invention; and FIG. 2 is an enlarged cross sectional view of the pump along the line 2—2 in FIG. 1.

Referring to FIG. 1, three pump cylinders are arranged in a common housing 2 and a portion of the engine section of the pump is shown schematically at 4. Generally, the pump has a piston 6 in each cylinder which is reciprocated by a connecting rod from the engine section 4. As shown in FIG. 2, there is an inlet valve 8 and an outlet valve 10 for each of the pump chambers 12 in the housing 2. There is a common exhaust manifold 14 extending through each of the exhaust valve chambers 16 with a common discharge conduit portion at each end of the housing 2.

This invention relates primarily to the cylinder cover arrangement for the pump chamber 12. The housing 2 has a cylindrical opening 18 extending through the housing and communicating with the pump chamber 12. A plug assembly 20 is secured over the end of the opening 18 to confine fluid in the chamber 12.

The plug assembly 20 has a cylinder cover element 22 and a cover retainer 24. The cover element 22 has a cylindrical primary bearing portion 26 which extends through a central opening 28 in the retainer 24. The cover element 22 has a secondary bearing portion 30 which is received in an annular recess 32 in the retainer 24. A radial flange 34 on the element 22 forms an abutment for engaging the end of the retainer 24. The depth of the recess 32 is slightly greater than the axial length of the secondary bearing surface 30 to assure direct engagement of the retainer 24 with the flange 34. A sealing ring 36 is mounted in a groove 38 in the cover element 22, for preventing the leakage of fluid around the plug assembly 20.

The plug assembly is secured in the housing 2 by screw threads 40 on the retainer 24, which engage corresponding threads in the housing 2. A shoulder 42 on the wall of the opening 18 forms a seat for the sealing ring 36. As the retainer 24 is screwed into the housing 2, the flange 34 on the cover element 22 compresses the sealing ring 36 against the shoulder 42. The element 22 is loosely secured in the retainer 24 by a snap ring 44. The primary bearing portion 26 and the secondary bearing portion 30 are received in the central opening 28 and the recess 32, respectively of the retainer 24 to assure that the cover element 22 is aligned with the shoulder 42. The bearing portions 26 and 30 permit the retainer 24 to be screwed into the housing, without turning the cover element 22, because the sealing ring 36 may be damaged, if there is relative rotational movement between the shoulder 42 and the ring 36.

A fluid chamber is formed in the plug 20 between the element 22 and the retainer 24. A radial surface 46 on the cover element 22 extends between the primary bearing portion 26 and the secondary bearing portion 30. A corresponding radial surface is formed in the retainer 24 by the recess 32. A hollow annular groove 48 is formed in the retainer 24 opposite the radial surface 46 and a pair of fluid sealing rings 50 are provided on opposite sides of the groove 48. As shown in FIGS. 1 and 2, a passageway 52 extends through the housing 2 and communicates with the exhaust valve chamber 16. Since there is a common manifold 14, a single passageway 52 is required for supplying fluid under pressure to the plugs 20 of each of the pump sections. A conduit 54 communicates with each of the plugs 20 and a passageway 56 extends through the retainer between the groove 48. The conduit is connected to the passageway 56 by a conventional fitting 58.

The plug 20 may be readily secured in the housing opening 18 by screwing the retainer ring 24 into the opening until the sealing ring 36 is tightly compressed against the shoulder 42. The conduit 54 is then fastened to the fitting 58 and the pump is ready for operation. As soon as the piston 6 has completed a few strokes, the pressure in the valve chamber 16 will have increased and the chamber pressure is transmitted to the groove 48 in the retainer 24 through the conduit 54. The fluid pressure in the groove 48 urges the cover element 22 to be displaced axially toward the piston 6. After a brief period of operation of the pump, the fluid pressure in the exhaust manifold 14 is only slightly less than the maximum fluid pressure developed in the pump chamber 12. As the cover element 22 and the retainer 24 separate, the fluid flows into the space between the sealing rings 50. The fluid pressure acting on the radial surface 46 and on the radial portion of the recess 32 imposes an axial force on the threads 40 and on the sealing ring 36. Although the force imposed on the radial surface 46 of the cover element 22 is less than the force imposed by the pressure in the chamber 12, since the area of the radial surface 46 is substantially less than the area of the opening 18, it does substantially reduce the maximum cyclic load on the threads 40 and significantly lengthens the life of the retainer ring 24. The maximum length of the fluid pressure loading on the sealing ring 36 is probably derived during the intake stroke of the piston. At that time, the axial force on the surface 46 maintains a substantially higher compression force on the sealing ring 36 and could be obtained merely by tightening the ring 24. At the same time, the axial force on the threads is higher, and accordingly, the difference between the maximum and minimum axial force on the threads during compression and intake strokes, respectively, is reduced.

While this invention has been illustrated and described in one embodiment, it is recognized that variations and changes may be made therein without departing from the invention as set forth in the claims.

I claim:

1. In a pump of the type having a housing with a cylinder therein, a piston mounted for reciprocation in the cylinder, intake and exhaust manifolds, and a cylinder head, said head comprising a cover element extending across said cylinder, a cover retainer secured in said housing on the side of the cover element opposite said cylinder, said cover element and said cylinder each having a radial shoulder therein, sealing means interposed between said radial shoulders, said retainer and said cover element having opposed radial surfaces therebetween, and means for conducting fluid from said exhaust manifold to said surfaces, whereby the exhaust fluid pressure imposes an axial force on the cover element to reduce cyclic loading on the sealing means while the pump is operating.

2. In a pump of the type having a housing with a cylinder therein, a piston mounted for reciprocation in the cylinder, intake and exhaust manifolds, and a cylinder head, said head comprising a cover element extending across said cylinder, a cover retainer, screw thread means for securing said retainer to said housing on the side of the cover element opposite said cylinder, said cover element and said cylinder each having a radial shoulder therein, sealing means interposed between said radial shoulders, said retainer and said cover element having opposed radial surfaces therebetween, and means for conducting fluid from said exhaust manifold to said surfaces, whereby the exhaust fluid pressure imposes an axial force on the cover element to reduce cyclic loading on the sealing means while the pump is operating.

3. In a pump of the type having a housing with a cylinder therein, a piston mounted for reciprocation in the cylinder, intake and exhaust manifolds, and a cylinder head, said head comprising a cover element extending across said cylinder, a cover retainer secured in said housing on the side of the cover element opposite said cylinder, said cover element and said cylinder each having a radial shoulder therein, sealing means interposed between said radial shoulders, said retainer having an opening therethrough, said cover element extending through the opening in close fitting relation with said retainer, said retainer and said cover element having opposed radial surfaces therebetween, and means for conducting fluid from said exhaust manifold to said surfaces, whereby the exhaust fluid pressure imposes an axial force on the cover element to reduce cyclic loading on the sealing means while the pump is operating.

4. In a pump of the type having a housing with a cylinder therein, a piston mounted for reciprocation in the cylinder, intake and exhaust manifolds, and a cylinder head, said head comprising a cover element extending across said cylinder, a cover retainer secured in said housing on the side of the cover element opposite said cylinder, said cover element having a radial flange, said cylinder having a shoulder thereon, sealing means interposed between said flange and said shoulder, said retainer having an opening therethrough, said cover element having a bearing portion extending through said opening and having a radial surface between said bearing portion and said flange, said retainer overlapping said radial surface, and means for conducting fluid from said exhaust manifold to said surfaces, whereby the exhaust fluid pressure imposes an axial force on the cover element to reduce cyclic loading on the sealing means while the pump is operating.

5. In a pump of the type having a housing with a cylinder therein, a piston mounted for reciprocation in the cylinder, intake and exhaust manifolds, and a cylinder head, said head comprising a cover element extending across said cylinder, a cover retainer secured in said housing on the side of the cover opposite said cylinder, said cover element having a radial flange, said cylinder having a shoulder thereon, sealing means interposed between said flange and said shoulder, said retainer having an opening therethrough, said cover element having a bearing portion extending through said opening and having a radial surface between said bearing portion and said flange, said retainer overlapping said radial surface and having a passageway therein communicating with said radial surface, and conduit means communicating between said passageway and said exhaust manifold, whereby the exhaust fluid pressure imposes an axial force on the cover element to reduce cyclic loading on the sealing means while the pump is operating.

6. In a pump of the type having a housing with a cylinder therein, a piston mounted for reciprocation in the cylinder, intake and exhaust manifolds, and a cylinder head, said head comprising a cover element extending across said cylinder, a cover retainer secured in said housing on the side of the cover element opposite said cylinder, said cover element and said cylinder each having a radial shoulder therein, sealing means interposed between said radial shoulders, means forming a fluid chamber between said retainer and said cover element, means on said retainer for axially aligning said cover element with said cylinder, and means for conducting fluid from said exhaust manifold to said shoulder, whereby the exhaust fluid pressure imposes an axial force on the cover to reduce cyclic loading on the sealing means while the pump is operating.

7. In a pump of the type having a housing with a plurality of cylinders therein, a piston mounted for reciprocation in each cylinder, intake and exhaust manifolds for each cylinder, and individual cylinder heads, each of said heads comprising a cover element extending across said cylinder, a cover retainer secured in said housing on the side of the cover opposite said cylinder, said cover element and said cylinder each having a radial shoulder thereon, sealing means interposed between said radial shoulders, means forming a fluid chamber between said retainer and said cover element, means on said retainer for axially aligning said cover element with said cylinder, means providing fluid communication between said exhaust manifolds, and means for conducting fluid from said fluid communicating means and said chamber, whereby the exhaust fluid pressure imposes an axial force on the cover element to reduce cyclic loading on the sealing means while the pump is operating.

8. In a pump of the type having a housing with a plurality of cylinders therein, a piston mounted for reciprocation in each cylinder, intake and exhaust manifolds for each cylinder, and individual cylinder heads, each of said heads comprising a cover element extending across said cylinder, a cover retainer secured in said housing on the side of the cover opposite said cylinder, said cover element having a radial flange, said cylinder having a shoulder thereon, sealing means interposed between said flange and said shoulder, said retainer having an opening therethrough, said cover element having a bearing portion extending through said opening and having a radial surface between said bearing portion and said flange, said retainer overlapping said radial surface, said retainer having a passageway therein communicating with said radial surface, means providing fluid communication between said exhaust manifolds, and means for conducting fluid from said fluid communicating means and said chamber, whereby the exhaust fluid pressure imposes an axial force on the cover element to reduce cyclic loading on the sealing means while the pump is operating.

References Cited by the Examiner
UNITED STATES PATENTS
2,732,809   1/1956   Mattingly et al. _____ 103—216
FOREIGN PATENTS
971,419   9/1964   Great Britain.

ROBERT M. WALKER, *Primary Examiner.*